United States Patent [19]

Denz et al.

[11] Patent Number: 4,856,465

[45] Date of Patent: Aug. 15, 1989

[54] MULTIDEPENDENT VALVE TIMING OVERLAP CONTROL FOR THE CYLINDERS OF AN INTERNAL COMBUSTION ENGINE

[75] Inventors: Helmut Denz, Stuttgart; Martin Person, Oberriexingen, both of Fed. Rep. of Germany

[73] Assignee: Robert Bosch GmbH, Stuttgart, Fed. Rep. of Germany

[21] Appl. No.: 555,949

[22] Filed: Nov. 29, 1983

[30] Foreign Application Priority Data

Dec. 24, 1982 [DE] Fed. Rep. of Germany ....... 3247916

[51] Int. Cl.$^4$ .............................................. F01L 1/34
[52] U.S. Cl. ................................ 123/90.17; 123/90.15
[58] Field of Search ............... 123/90.15, 90.16, 90.17, 123/90.18

[56] References Cited

U.S. PATENT DOCUMENTS

| | | | |
|---|---|---|---|
| 3,741,176 | 6/1973 | Schmidt et al. | 123/90.15 X |
| 3,978,829 | 9/1976 | Takahashi et al. | 123/90.15 |
| 4,091,776 | 5/1978 | Clemens et al. | 123/90.15 |
| 4,231,330 | 11/1980 | Garcea | 123/90.15 |
| 4,354,460 | 10/1982 | Mae et al. | 123/90.16 |
| 4,408,580 | 10/1983 | Kosuda et al. | 123/90.16 |
| 4,452,188 | 6/1984 | Kosuda et al. | 123/90.18 |

Primary Examiner—Ira S. Lazarus
Assistant Examiner—Peggy Neils
Attorney, Agent, or Firm—Frishauf, Holtz, Goodman & Woodward

[57] ABSTRACT

The oil pressure applied to a hydraulic device for controlling within a limited angular range of a cam shaft and its drive gear is controlled by a magnetic valve (35) which is switched between its open and closed position under control of the same microcomputer which controls engine ignition and/or fuel injection with reference to a predetermined function of some of the same engine operation parameters, namely engine speed and engine load, which are used to control ignition and/or fuel injection. The control function can advantageously also take account of rate of change of engine load or engine speed. A transducer (43) for reporting back the sleeve (22) which controls the mechanical rotary shift in response to oil pressure can be used to provide an actual value signal to the computer for generation of an error signal for controlling the magnetic valve so as to provide a continuous control of the overlap of the open periods of the intake and exhaust valves of the engine. The control function for the operation of the magnetic valve provides for hysteresis to prevent excessive switching back and forth.

4 Claims, 1 Drawing Sheet

MULTIDEPENDENT VALVE TIMING OVERLAP CONTROL FOR THE CYLINDERS OF AN INTERNAL COMBUSTION ENGINE

This invention concerns the control of the overlap of the open intervals of the intake and exhaust valves of cylinders of an internal combustion engine by a mechanical agency interposed in the drive of the cam shaft of the engine.

Control apparatus of this kind is known, for example, from the disclosure of published German patent application DE-OS 31 26 620. In the apparatus there disclosed, a timing shift element engaged by an oblique-toothed gear angularly shifts the drive gear of the cam shaft relative to the cam shaft, and does so by force developed hydraulically in response to oil pressure. The control of the hydraulic pressure is produced by a mechanical release valve constructed as a centrifugal force switch opening at a certain rotary speed of the cam shaft in order to reduce the oil pressure and thereby obtain an angular displacement of the cam shaft.

The control of intake and exhaust valves by means of a cam shaft in Otto engines of conventional construction involves a compromise regarding the overlap of the intake and exhaust valving generally known as the valve overlap $V_o$. As the result of this compromise, at small speeds and loads a small valve overlap is provided for reasons of quietness of operation and exhaust gas quality, among others, while at high engine speeds and loads, on the other hand, a large valve overlap is used because of advantages in obtaining high power development. Valving control in accordance with present practice, applied to a cam shaft for control of the intake valve, typically keeps $V_o$ small below a switchover rotary speed of about 1600 r.p.m. Because of the low level of internal exhaust gas recycling, the running quietness of the engine is good and the hydrocarbon emissions are low (especially in idling and at low load). About the switchover speed, a high value of $V_o$ is mechanically set so that at high load a high torque will be generated.

A disadvantage of the known system is, on the one hand, the high engineering and manufacturing cost of perfecting and producing mechanically speed-controlled pressure release valves that switch over only at a quite precisely determined shaft speed. Variable switchover depending upon speed, particularly in accordance with a defined function of speed, is not possible in such arrangements. Furthermore, the cam shaft must be expensively disassembled in the case of malfunction or damage of the centrifugal hydraulic switch.

It has further been found that at low speed and high load (e.g., acceleration phases) the nitrogen oxide emissions are greater and a lower torque is developed than would be the case with a higher $V_o$. It has now likewise been found that at small load and higher speed (above the switchover speed), the engine quietness and the hydrocarbon emissions greatly deteriorate because of the still high residual gas component. The residual gas, moreover, is responsible for an increased fuel consumption in the entire speed range above the switchover speed, particularly at low loads, but also up to medium loads. This leads to incomplete combustion and also slower combustion, which increases heat loss. Furthermore, with smaller $V_o$, the engine must be operated with a greater throttle valve opening for the same load than is the case with greater $V_o$ where smaller throttling losses result. On an overall basis, it has thus now become apparent that $V_o$ control solely by speed is quite unsatisfactory. Influencing the control by other influencing magnitudes is not possible, however, with apparatus according to present practice.

SUMMARY OF THE INVENTION

It is an object of the present invention to overcome the limitations of the conventional devices and to provide, with the least possible complication and expense, a multi-dependent control of the valve overlap ($V_o$) through a rotary shift of the cam shaft relative to its drive. It is a further object to make such a control capable of utilizing input control magnitudes already present when a microcomputer is used for other engine operation control, in order to produce a highly variable setting function for the $V_o$.

Briefly, the hydraulic valve is constituted as an electromagnetic valve and is arranged to be controllable by a microcomputer which also controls at least the ignition and/or the fuel injection of the internal combustion engine. The magnetic valve has two switching states which are selected for being switched in a manner dependent upon a predetermined function of the engine speed (n) and the engine load ($t_1$). *Preferably, the prescribed function also takes into account the rate of change of load, which corresponds to vehicle acceleration.*

The invention has the advantage that engine operation parameters already present in a microcomputer lend themselves in the separate way to apply any of a wide variety of functions of several parameters as control functions for the $V_o$, although essentially all that is needed for the function to control is merely an electromagnetic valve operating hydraulically to control hydraulic fuel supply, hydraulic fuel release or both.

By optimizing the operating points of the hydraulic valve with reference to the values of load and speed, a noticeable reduction of fuel consumption, an improvement of running quietness and an improvement of driving behavior in the regions of idling and low or medium load operation which are sensitive to bucking effects are all obtained. At the same time, a reduction of hydrocarbon emissions is produced. By empirical determination of the $V_o$ favorable for the various combinations of engine speed and load, the necessary or most desired function for the particular application can be established and made effective in the vehicular engine computer.

Furthermore, when the rate of change in load is utilized as a further functional input magnitude, a drastic reduction of nitrogen oxide emission is obtained, even to the extent of making an external exhaust gas recycling system superfluous in many cases, even for the case of severe emission limitation standards.

Another aspect of the invention provides for continuous regulation of a two-position electromagnetic valve controlling the $V_o$ in dependence upon operating data of the engine by a computer also serving the ignition and/or fuel injection functions. For that purpose, a position transducer for the rotary angle between drive gear and cam shaft is necessary, but the result is a still finer fitting of the $V_o$ to circumstances, with improved engine operation properties. The multi-function computer in such cases computes the desired $V_o$ with reference to a predetermined function of engine operation parameters, such as, but not limited to, engine speed and engine load, and compares the result with the actual value of $V_o$ as represented by a signal produced by the position transducer. Resulting error signals then operate the valve in a continuing series of operations causing actual $V_o$ to approach desired $V_o$.

BRIEF DESCRIPTION OF THE DRAWINGS:

The invention is further described by way of illustrative example with reference to the annexed drawings in which.

Figure 1:
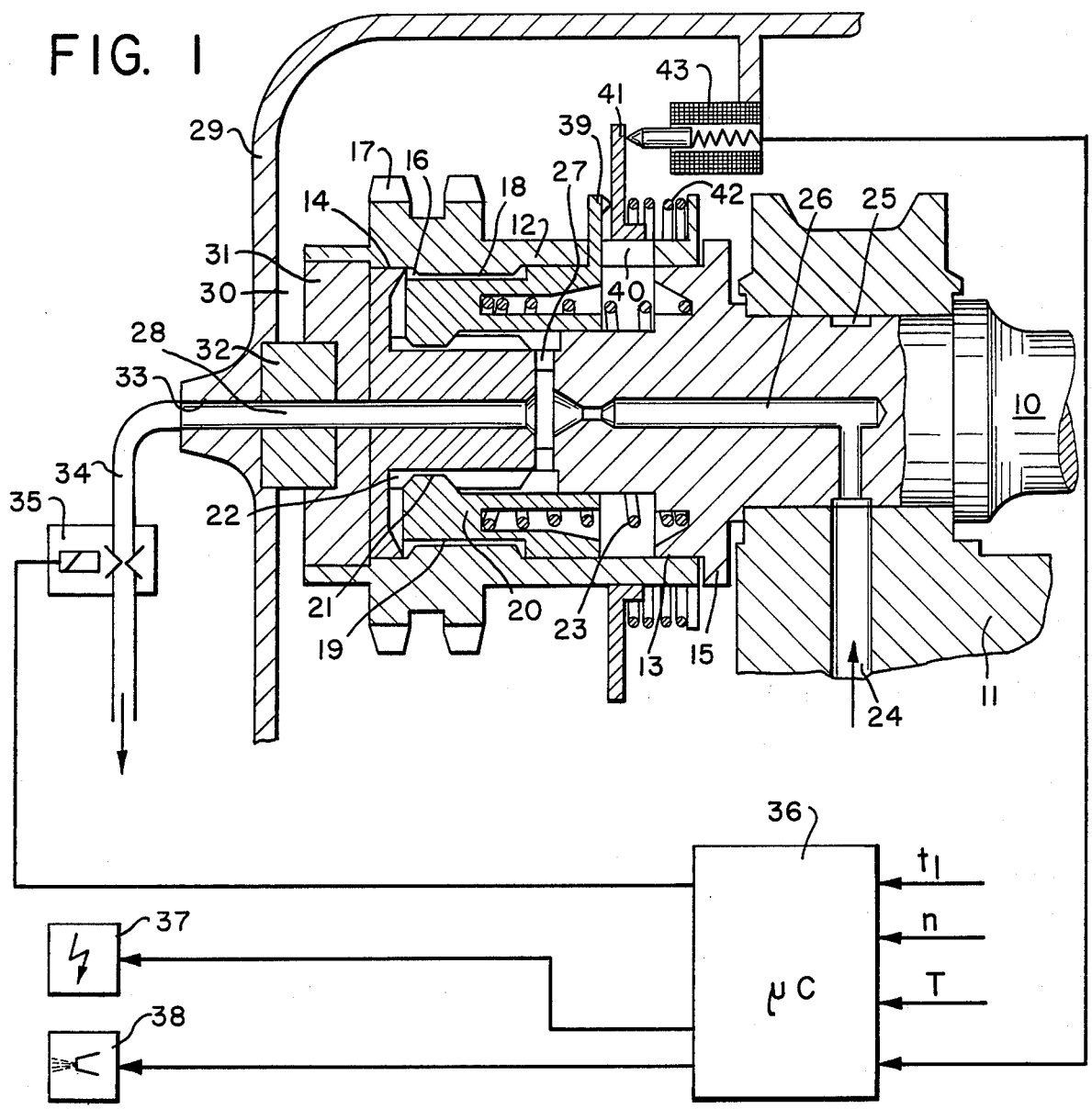
FIG. 1 is a diagrammatic cross-section of a hydraulic cam shaft shift control including a block circuit diagram of its electrical control circuit and components.

DESCRIPTION OF THE ILLUSTRATED EMBODIMENTS:

FIG. 1 shows the driven end of a cam shaft 10 that is equipped in the usual way (not shown) with cams for control of the intake and/or exhaust valves of an internal combustion engine. It is also possible to utilize a shift device as shown in connection with an engine that utilizes separate cam shafts for separately controlling the intake and exhaust valves.

The cam shaft 10 is mounted in bearings in the engine head portion of the motor. A cylindrical sleeve 12, coaxial with the cam shaft, is mounted on the latter in a fashion allowing it to rotate at its end respectively on the cylindrical surfaces 13 and 14 of the cam shaft. Axial displacement of the sleeve 12 relative to the cam shaft 10 is prevented by the stop features 15 and 16.

The sleeve 12 has external toothing 17 to which the drive, not further shown in the drawing, from the engine crank shaft by means of a chain or a toothed belt takes place. The sleeve 12 also has internal toothing 18 which engages the external teeth 19 of an annular piston 20. The annular piston 20 also has internal teeth which engage the external teeth 22 of the cam shaft. At least one of the interfitting gear toothings 18/19 and 21/22 is composed of obliquely running teeth. The annular piston 20 can thus be shifted in the annular space bounded by the sleeve 12 and the cam shaft 10. Since the gear teeth always remain in engagement, when there is a relative movement of the annular piston 20 in the axial direction, the cam shaft 10 is rotated relative to the sleeve. This means that this rotary shift of the cam shaft takes place relative to the crankshaft of the motor. The degree of rotary shift which is produced by the controlled operation of the valve controlled, for example by the engine speed, depends upon the degree of axial shift of the annular piston 20 and also on the angle of inclination of the oblique gear toothing in the axis of rotation. Here, for example, when only the intake valves are controlled by a cam shaft equipped as shown in FIG. 1, while the exhaust valves are controlled by a fixedly coupled cam shaft, a change of the valve overlap ($V_o$) is produced in accordance with the axial shift of the annular piston 20.

The annular piston 20 is shown in FIG. 1 in one of its end positions into which it is held by the mechanical bias of a spring 23. A hydraulic pressure can be brought to bear on the annular surface of the piston 20 lying opposite the spring 23, this surface being perpendicular to the cam shaft axis, by which hydraulic pressure the piston 20 can be shifted against the force of the spring. The hydraulic liquid medium, typically the pressurized engine oil, is introduced by the line 24 in the engine head part 11 into an annular groove 25 in the cam shaft 70, then to a line 26 in the cam shaft and finally through the end surface of the annular piston 20 through radial bores 27. A shift of the annular piston 20 naturally occurs only when there is sufficient oil pressure, i.e. when a release line 28 is closed which runs in the axial direction away from the end surface of the cam shaft 70. When the release line is open, however, the pressurized oil can flow out through the release line without effect on the piston 20. The structural components described up to now are known from the art as disclosed in the reference cited in the introduction to this specification, where they are described in greater detail. The following description explains the dispositions provided in accordance with the invention.

A feed-through bearing 30 is provided for extension of the release line 28 through the cylinder head walls 29 to the exterior of the engine block. The rotary part 31 of the feed-through bearing is seated in one end of the sleeve 12, while the fixed part 32 is tightly inserted in the cylinder head wall 29 (or sealed onto this cylinder head wall). The bore through the feed-through bearing 30 is prolonged as the bore 33 through the cylinder head wall 29 and discharges into an external release line 34 through which the oil is led back again into the oil circulation system of the engine. A magnetic valve 35 is interposed in the external release line 34 and is electrically connected for control by a microcomputer 36.

The microcomputer 36 also controls the ignition 37 and the fuel injection 38 of the engine, which are symbolically shown in FIG. 1. The final switching stages required in practice between the microcomputer and the devices controlled by it are not shown in the drawing in order to simplify the illustration. Input parameter magnitudes are supplied in a known way to the microcomputer 36, from which the microcomputer determines the instants of ignition and the fuel injection periods in accordance with predeterminable functions and/or stored fields of characteristic data. In an equivalent manner the switching operations of the magnetic valve 35 can be determined by the microcomputer. The load $t_1$, the engine speed n (with reference mark) and the temperature T are supplied through the microcomputer 36 as input magnitudes.

Figure 2:
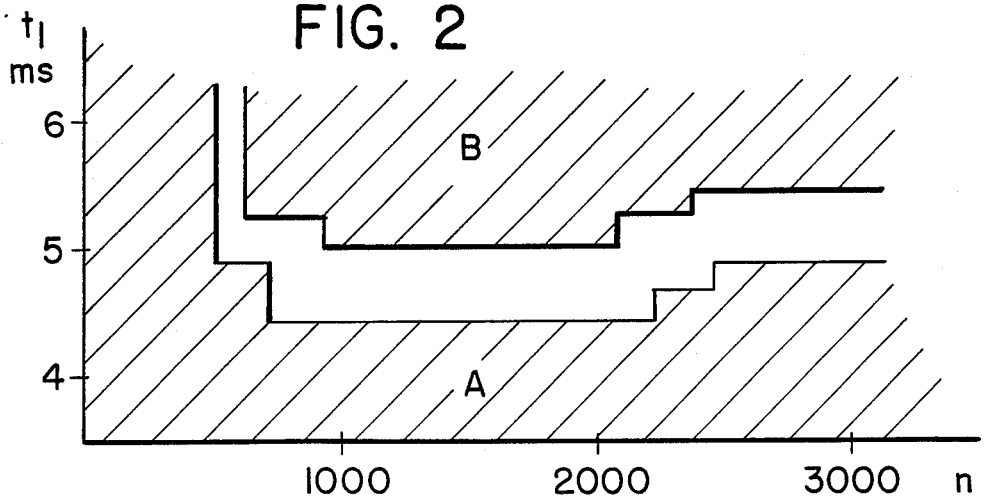
FIG. 2 is a graphical representation of a control function for the system of FIG. 1 in terms of values of load $t_1$ and engine speed n.

A function depending upon the input magnitudes $t_1$ and n, preferably empirically determined beforehand, is formed in the microcomputer 36, such a function being shown, for example, in FIG. 2. In FIG. 2 the region A defines the combination of load speed values for which the magnetic valve 35 is open and the annular piston 20 accordingly is in the illustrated position. In the region B the magnetic valve 35 is closed and the annular piston 20 is in its opposite extreme position, where a large valve overlap ($V_o$) is produced for the engine. The intermediate region between A and B represents the hysteresis that prevents a continuous switching back and forth of the magnetic valve, which means that in this region the direction of switching determines whether the valve is open or closed.

The load signal $t_1 = K \cdot Q_1/n$ in which $Q_1$ is the throughput of air. In principle, other kinds of engine load signals can be used instead, as for example the absolute pressure in the intake manifold or the position of the throttle valve.

As shown in FIG. 2, at low engine speeds, particularly in starting, operation is only with small $V_o$, in order to improve starting and run-up to operating engine speeds. For this reason, care must be taken to constitute the oil pressure control circulation system so that $V_o$ is small in the absence of oil pressure, since before starting there is still no oil pressure present. At high speeds and small load, operation is likewise with small $V_o$. On the other hand, at high speed and high load, the magnetic valve 35 is closed so that the $V_o$ is made large. A correction on account of acceleration can advantageously be built in. This means that a differentiated signal derived from the engine load signal or from the engine speed signal is formed in the computer which produces closing of the magnetic valve 35 for a certain time beginning with a certain signal value. This leads to a discernible reduction of the nitrogen oxide component in the exhaust gas.

Instead of the heretofore described switching over of the magnetic valve 35 between its closed and open positions, with the control of the annular piston 20 by the valve 35 putting it into one or the other of its extreme positions, in an improved embodiment of the system of the invention a continuously operating control of the magnetic valve 35 is advantageously provided. For that purpose the electromagnetic valve must be controlled in a known way with variable-dirty-cycle pulses in order to obtain by pulsing the valve 35, the equivalent of a continuous change of effective cross-section in the external release line 34. In that manner, the setting of any desired value of $V_o$ is possible. Since the oil pressure of an internal combustion engine usually fluctuates strongly, it is then necessary for this purpose to provide regulation, for which there must be a reporting back of the position of the annular piston 20 to the microcomputer 36 as an actual value for the generation of an error signal. A corresponding desired value will then be produced in the microcomputer 36 in accordance with the function formed from the engine speed and engine load or from engine speed, engine load and acceleration, so that the actual value of the piston position can be caused to approach the desired value by varying the duty cycle of the pulsing of the valve 25. In order to report the actual value, the piston 20 has a radial extension 39 which projects through an axial slot 40 in the cylindrical sleeve 12 to the outside of the sleeve. This extension shifts a ring plate 41 axially against the force of a spring 42. A displacement transducer 43, fixed on the cylinder head wall 29, detects the position of this ring plate 41, thus indirectly detecting the valve overlap ($V_o$). The signal of this transducer 43, which is preferably an inductive transducer, is supplied to the microcomputer 36. The desired value of $V_o$, with which the detected actual value is compared, can advantageously be stored as a characteristic data field in the microcomputer 36, the stored values of which depend upon the parameters already mentioned, according to a desired function that can easily be empirically determined, so that the stored values can be addressed for retrieval in terms of the proper combination of parameter values.

Although the invention has been described with reference to an illustrated example having particular optional as well as essential features, it will be understood that further variations and modifications are possible within the inventive concept.

We claim:

1. Apparatus for controlling valves of an internal combustion engine through a camshaft having a drive gear which is hydraulically rotatably on said camshaft over a predetermined angle, the rotation of said camshaft drive gear relative to said camshaft being controllable in a manner dependent upon engine speed by a hydraulic device in turn controlled by a valve affecting flow of a hydraulic fluid, said engine having an engine block and having at least one of the functions of engine ignition and fuel injection controlled by a computer associated with said engine, said apparatus having the improvement which comprises:

an electromagnetic valve serving as said valve and located outside said engine block in a hydraulic line for control of said hydraulic medium;
   rotary feed-through bearing means for connecting said line to said hydraulic device;
   means for operating said electromagnetic valve for rotating said camshaft relative to said drive gear under control through electrical circuits by said computer which also controls at least one of the functions of engine ignition and fuel injection for said engine, said electromagnetic valve having two switching positions between which it is moved under control of said computer in accordance with a predetermined function that depends upon engine speed (n) and engine load ($t_1$) of said engine, said predetermined function providing for hysteresis in the switch over of said magnetic valve between its switching positions and being stored in said computer as a field of function values addressable by corresponding combinations of values of engine speed and engine load as detected for and furnished to said computer.

2. Apparatus for controlling valves of an internal combustion engine, having an engine block through a camshaft having a drive gear which is hydraulically rotable on said camshaft over a predetermined angle, the rotation of said camshaft drive gear relative to said camshaft being controllable in a manner dependent upon engine speed by a hydraulic device within said engine block, which device is in turn controlled by a valve affecting flow of a hydraulic fluid, said engine having at least one of its functions of engine ignition and fuel injection controlled by a computer associated with said engine, said apparatus having the improvement which comprises:

an electromagnetic valve serving as said valve and located outside said engine block in a hydraulic line for control of said hydraulic medium;
   rotary feed-through bearing means (31, 32) for connecting said line to said hydraulic device;
   means for indicating the position of said hydraulic device and thereby the actual relative angular position of said camshaft and said drive gear, and for producing an electrical signal representative thereof;
   means for pulsing said electromagnetic valve at a controllable variable duty cycle for rotating said camshaft relative to said drive gear under control through electrical circuits by said computer, in response to a computation by said computer of a desired position of said hydraulic device in accordance with a predetermined function of engine speed (n) and engine load ($t_1$) made available to said computer for its control of at least one of said engine functions, comparison of said desired position with a signal produced by said position indicating means, and provision by said computer of a succession of outputs for variation of said duty cycle of pulsing sense appropriate for causing said actual position to approach said desired position, said predetermined function being stored in said computer as a field of function values addressable by corresponding combinations of values of engine speed and engine load.

3. Apparatus according to claim 2, in which said predetermined function is stored in said computer as a field of function values addressable by corresponding combinations of function of engine speed, engine load and rate of change of engine load.

4. Apparatus according to claim 2, in which said predetermined function is stored in said computer as a field of function values addressable by corresponding combinations of function of engine speed, engine load and rate of change of engine speed.

* * * * *